(12) United States Patent
Jain et al.

(10) Patent No.: US 12,705,281 B2
(45) **Date of Patent: *Aug. 11, 2026**

(54) NATURAL LANGUAGE PROCESSING FOR SEARCHING SECURITY VIDEO DATA

(71) Applicant: Coram AI, Inc., Sunnyvale, CA (US)

(72) Inventors: Ashesh Jain, Sunnyvale, CA (US); Peter Ondruska, London (GB); Yawei Ye, London (GB); Qiangui Huang, Palo Alto, CA (US)

(73) Assignee: Coram AI, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/626,154

(22) Filed: Apr. 3, 2024

(65) Prior Publication Data

US 2025/0077576 A1 Mar. 6, 2025

Related U.S. Application Data

(63) Continuation of application No. 18/461,933, filed on Sep. 6, 2023, now Pat. No. 11,954,151.

(51) Int. Cl.

| | |
|---|---|
| ***G06F 16/00*** | (2019.01) |
| ***G06F 16/783*** | (2019.01) |
| ***G06T 7/11*** | (2017.01) |
| ***G06V 20/40*** | (2022.01) |
| ***G06V 20/52*** | (2022.01) |

(52) U.S. Cl.

CPC .............. *G06F 16/783* (2019.01); *G06T 7/11* (2017.01); *G06V 20/41* (2022.01); *G06V 20/52* (2022.01)

(58) Field of Classification Search

CPC ........... G06F 16/00; G06F 16/783; G06T 7/11

See application file for complete search history.

(56) References Cited

U.S. PATENT DOCUMENTS

| | | | |
|---|---|---|---|
| 2019/0304157 A1 | 10/2019 | Amer et al. | |
| 2022/0292827 A1 | 9/2022 | Chen et al. | |
| 2023/0055581 A1* | 2/2023 | Bidstrup | H04N 7/181 |

OTHER PUBLICATIONS

Apostolos Meliones et al., "Privacy-Preserving Intelligent Networked Video Surveillance for Patient Monitoring and Alarm Detection," PETRA '15 Jul. 1-3, 2015, pp. 1-8. (Year: 2015).*

Nomica Choudhry et al., "A Comprehensive Survey of Machine Learning Methods for Surveillance Videos Anomaly Detection," IEEE Access, Received Aug. 26, 2023, pp. 1-34. (Year: 2023).*

Arun Hampapur et al., "Searching Surveillance Video," IEEE, 2007, pp. 75-80. (Year: 2007).

(Continued)

*Primary Examiner* — Cheryl Lewis

(74) *Attorney, Agent, or Firm* — Chang & Hale LLP

(57) ABSTRACT

Embodiments are disclosed for using natural language processing (NLP) to manage security video data. A method of using NLP to search security video data includes receiving, by a surveillance video query system, a text query. A query embedding corresponding to the text query is obtained using a text query model. One or more matching frame embeddings that match the query embedding are identified in a vector database. Matching surveillance video data corresponding to the one or more matching frame embeddings is then obtained from a surveillance video data store. The matching surveillance video data is returned in response to receipt of the text query.

20 Claims, 10 Drawing Sheets

(56) References Cited

OTHER PUBLICATIONS

Ediz Saykol et al., “Scenario-Based Query Processing for Video-Surveillance Archives,” Engineering Applications of Artificial Intelligence, ScienceDirect, 2010, pp. 331-345. (Year: 2010).
Notice of Allowance, U.S. Appl. No. 18/461,933, Dec. 11, 2023, 10 pages.
Weiming Hu etal., “Semantic-Based Surveillance Video Retrieval,” IEEE Transactions on Image Processing, vol. 16, No. 4, Apr. 2007, pates 1168-1181. (Year: 2007).

* cited by examiner

800

NATURAL LANGUAGE PROCESSING FOR SEARCHING SECURITY VIDEO DATA

CROSS-REFERENCE TO RELATED APPLICATIONS

This application is a continuation of U.S. application Ser. No. 18/461,933, filed on Sep. 6, 2023, now U.S. Pat. No. 11,954,151, which is hereby incorporated by reference.

BACKGROUND

Video surveillance has become ubiquitous in modern life. It is now common for users to set up and manage home video surveillance systems, with multiple competing device ecosystems to choose from. In the business or enterprise context, video surveillance is generally provided by cameras in and around an office, job site, etc. These cameras may feed real-time video data to a central security desk and/or record the footage for later review.

SUMMARY

Embodiments are disclosed for using natural language processing (NLP) to manage security video data. A method of using NLP to search security video data includes receiving, by a surveillance video query system, a text query. A query embedding corresponding to the text query is obtained using a text query model. One or more matching frame embeddings that match the query embedding are identified in a vector database. Matching surveillance video data corresponding to the one or more matching frame embeddings is then obtained from a surveillance video data store. The matching surveillance video data is returned in response to receipt of the text query.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

Figure 1:
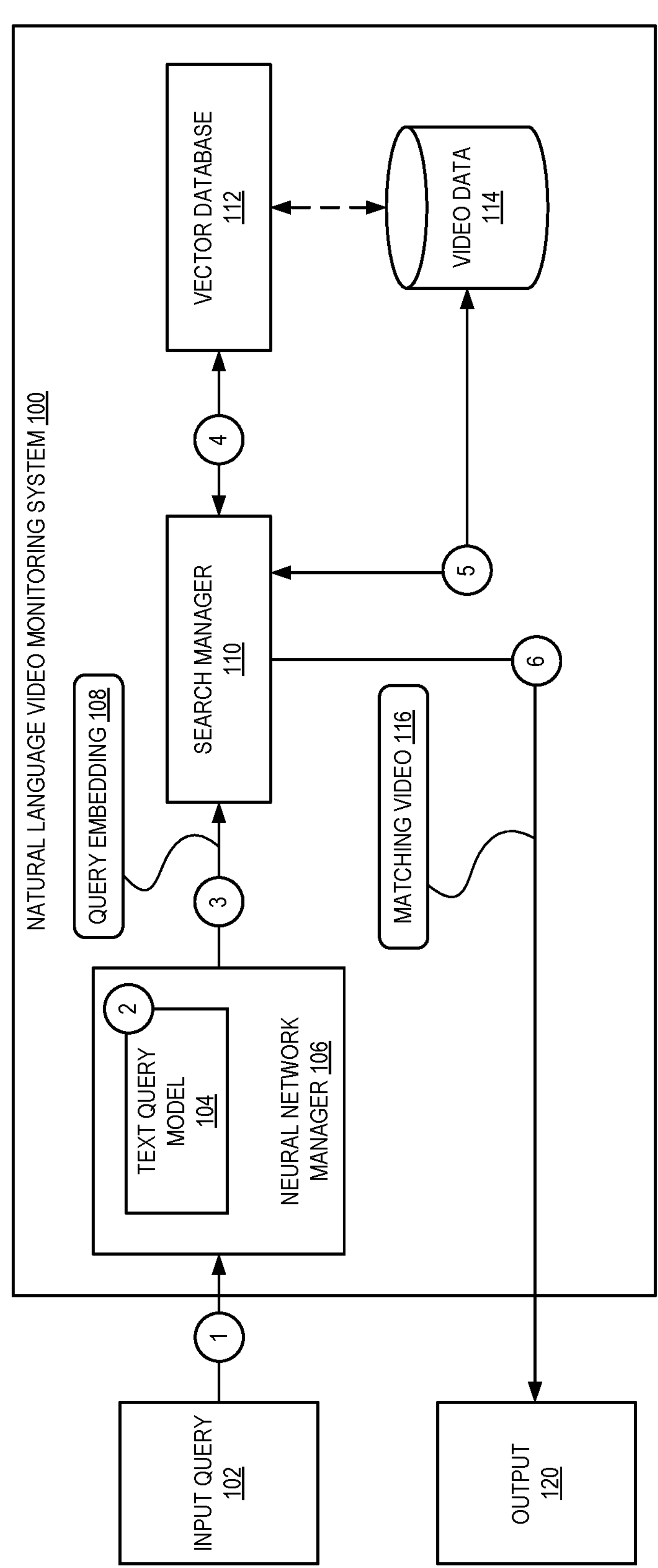
FIG. 1 illustrates a diagram of a process of using natural language processing (NLP) to search security video data in accordance with one or more embodiments.

One or more embodiments of the present disclosure enable surveillance video data to be managed using natural language processing (NLP) techniques. Traditional video surveillance collects a lot of raw video data. This is particularly true for businesses which may use a large number of cameras to monitor their offices, warehouses, campuses, etc. While such monitoring may provide some deterrence effects, actually using the surveillance data can be quite difficult. For example, identifying a relevant object or person of interest by manually reviewing hours of recordings across tens or hundreds of devices is expensive, time consuming, and resource intensive.

Recently, multi-modal machine learning techniques have enabled NLP to be used with image and video systems. For example, multi-modal models, such as Contrastive Language-Image Pretraining (CLIP), allow for a mix of data from different domains (e.g., text data and image/video data) to be applied to a specific task. However, existing approaches do not function well when applied to the business surveillance domain. For example, such systems are not typically trained on video surveillance data. This results in inaccurate or incomplete results being returned in response to NLP queries. Additionally, existing machine learning-enabled systems typically rely on AI enhanced camera devices. These cameras may include additional onboard processing to perform object detection, facial recognition, etc. However, such devices are expensive and typically lock a user in to a specific provider. Further, such devices are not regularly replaced, leading to outdated technology being left to handle increasingly complex real world surveillance issues.

Embodiments address these and other deficiencies in the prior art using a natural language video monitoring system that is implemented on-site at the customer's surveillance location (office, campus, warehouse, etc.). The system includes one or more cameras, a local network, and a Network Video Recorder (NVR) which performs various video processing tasks. The NVR includes a video indexing network, a video index, and video storage. The video indexing network is a neural network trained to receive a frame or snippet of video and output an embedding (video vector) that represents that frame or snippet. The embedding is stored in the video index and the video is stored in video storage. All of this is maintained locally on the NVR or on a dedicated device connected to the same local network. The NVR is compatible with any image/video capture device. Accordingly, the NVR provides an intelligent layer operating on top of the video surveillance system. This allows for existing infrastructure to be used, In some embodiments, the natural language video monitoring system includes a query system. The query system can be implemented separately and integrated into the NVR and/or via a separate client device. The query system allows for arbitrary text queries to be received and used to search for matching content in the video data. The query system is powered by a text query network which receives the text query and outputs an embedding (query vector). The query vector is matched to similar video vectors in the video index to identify portions of the video that match the query. This greatly simplifies the review and search of existing video surveillance data. Rather than requiring one or more users to sift through raw data in hopes of finding a particular person, object, etc. of interest, the natural language video monitoring system can identify likely matching video snippets based on natural language queries provided by a user.

Additionally, in some embodiments, the natural language video monitoring system may include an alarm system. Alarms may be defined based on a natural language description of the alarm conditions. This allows for real-time monitoring of the video surveillance data by the natural language video monitoring system. When an alarm condition is detected, one or more actions can be performed, such as notifying one or more persons of the alarm, activating other on-site systems, calling emergency services, etc.

FIG. 1 illustrates a diagram of a process of using natural language processing (NLP) to search security video data in accordance with one or more embodiments. As shown in FIG. 1, a natural language video monitoring system 100 may be configured to process NLP queries of video content. The natural language video monitoring system 100 may be implemented as, or executing on, a Network Video Recorder (NVR). The NVR may be a computing device, comprising one or more processing devices (central processing units, graphics processing units, accelerators, field programmable gate arrays, etc.), deployed to a customer site. In examples described herein, a customer site may refer to any location or locations where one or more NVRs and one or more video capture devices (e.g., cameras) are deployed. The customer site may also be referred to as a surveillance location.

At numeral 1, the natural language video monitoring system 100 receives an input query 102. The query may be received locally (e.g., via a user interface on the same device on which the natural language video monitoring system is executing), via a local web interface (e.g., over a local area network or other local network, or via a remote web interface (e.g., a hosted search service in a cloud provider system, etc.). The input query 102 may be a natural language text query. The input query 102 may define an object, person, etc. being searched for, a camera location, camera identifier, date, time, or other search parameters. For example, the query may be "find a person wearing a yellow hat, visible by camera 1 or camera 2, during the day on April 3$^{rd}$" In some embodiments, a user interface is provided allowing user to input text input using a web dashboard, connected terminal, generate text from speech-to-text translation, etc. Alternatively, the user can be presented with a predefined set of text queries.

The input query is received by a text query model 104. The text query model 104 may be a neural network which receives a text input and outputs one or more vector descriptors (e.g., embeddings) based on the text input. The text query model 104 may be an off-the-shelf model of various architectures. In some embodiments, the text query model 104 may be implemented as a transformer architecture. In various embodiments, the text query model may be trained in concert with a video indexing model (discussed further below) using text, image-text, and video-text pairs, or combinations thereof, such that related text and video data results in similar embeddings being generated by the respective models.

As shown in FIG. 1, the text query model 104 may be hosted by a neural network manager 106. The neural network manager 106 may be an execution environment provided by, or accessible to, the natural language video monitoring system 100. The neural network manager 106 may include all of the data, libraries, etc. needed to execute the text query model 104. Additionally, in some embodiments, the neural network manager 106 may be associated with dedicated hardware and/or software resources for execution of the text query model 104. At numeral 2, the text query model processes the input query 102 to generate a query embedding 108. The query embedding 108 is then provided to search manager 110 at numeral 3.

Search manager 110 may act as an orchestrator for processing the query and returning a result. For example, at numeral 4, the search manager 110 can query a vector database 112 to identify similar vectors (e.g., embeddings) to the query embedding. In some embodiments, the vector database may store vector descriptor embeddings produced by a video indexing network and associated metadata, such as, video identifier, camera identifier, time of day, date, etc. The search manager 110 can identify similar vectors using L2, cosine similarity, or other similarity metric and number of additional metadata criteria, such as time range or camera ID, etc. In some embodiments, the similar embeddings (e.g., those that meet a similarity threshold) may be returned to the search manager 110.

At numeral 5, the search manager 110 can use the similar embeddings to retrieve corresponding videos (e.g., frames, clips, etc.) from video data 114. For example, the video identifier metadata associated with each similar embedding may be used to look up the corresponding video in video data 114. The search manager can then return one or more of the matching videos 116 to the user at numeral 6. In some embodiments, the input query 102 and the matching video output 120 may be received/returned via a user interface, such as a web dashboard. In some embodiments, the user interface displays relevant video results to the user. For example, the matching videos may be ranked and presented to the user in order of ranking. The user can then select to view the matching videos. In some embodiments, additional information and/or a summary of the search results may be presented, such as number of clips, or specifics relevant to the query.

The example described above corresponds to an installation with a single NVR. For example, the natural language video monitoring system 100 executes on one NVR which has access to video data from all of the cameras at that installation. However, large-scale deployments of several hundreds of cameras or across multiple locations may require several edge devices (e.g., NVRs) to be installed. In such embodiments, the NVRs may execute in parallel, each processing data from a different subset of cameras. When a user provides input query 102, it may be sent to all NVRs. Each NVR may then process the query as described above and return a list of results (e.g., matching videos). In some embodiments, each matching video also includes its associated similarity metric value. This allows for the matching videos from each NVR to be merged into a single list, based on similarity, before being presented to the user.

Figure 2:
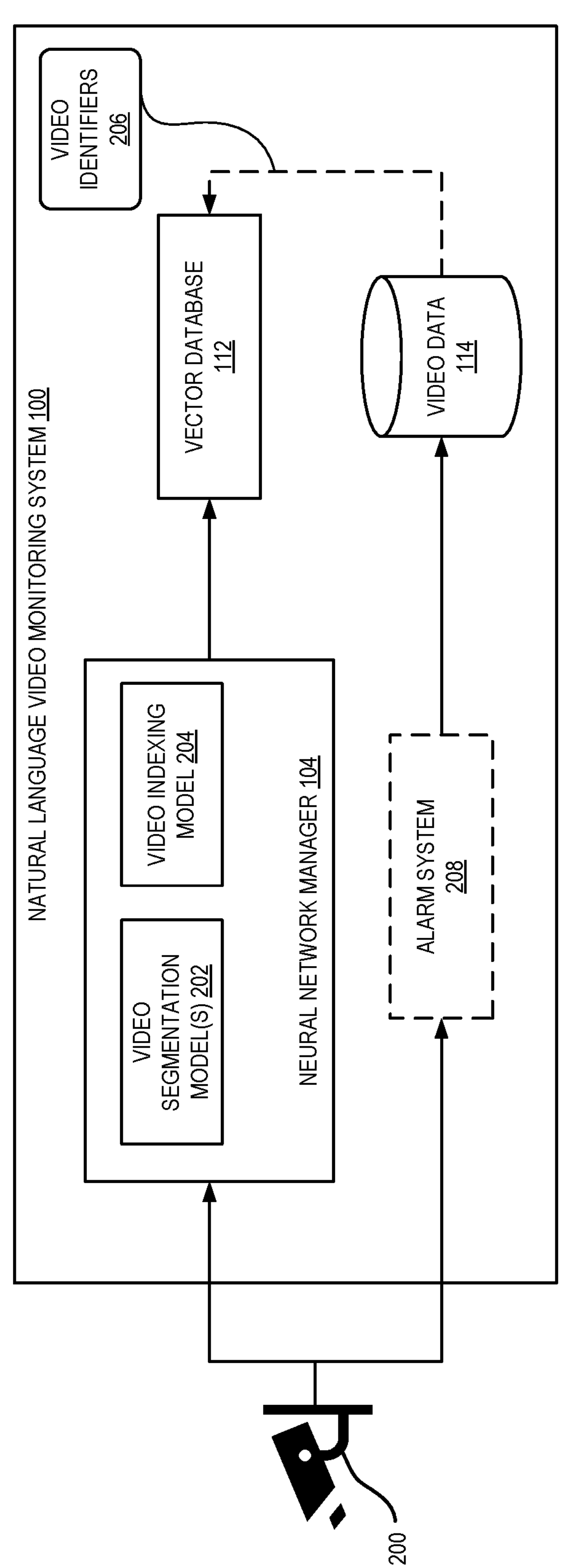
FIG. 2 illustrates a diagram of a process of indexing security video data for NLP search in accordance with one or more embodiments.

FIG. 2 illustrates a diagram of a process of indexing security video data for NLP search in accordance with one or more embodiments. As described above, video surveillance data captured at a customer site (e.g., surveillance location) may be recorded and queried using NLP techniques. The video surveillance data is captured and indexed to facilitate this processing. As shown in FIG. 2, a customer site can include one or more surveillance cameras 200. These may include any networkable image or video capture devices, such as IP cameras. As used herein, networkable may refer to any device capable of wired or wireless communication with the natural language video monitoring system 100.

The cameras 200 may be deployed to various locations around a customer site. Each camera may stream video data to the natural language video monitoring system 100. When the video data is received it is processed by one or more video segmentation models 202 and a video indexing model 204. As discussed, the natural language video monitoring system 100 may include a neural network manager 106 that provides an execution environment for one or more machine learning models. In some embodiments, multiple models may execute in the same neural network manager. Alternatively, each machine learning network may be associated with its own neural network manager.

In some embodiments, the video segmentation models 202 may be used to identify a region of interest (if any) in each frame. The frame and the regions of interest (if any) may be processed by video indexing model 204 to generate an embedding for each frame and region of interest. The resulting embeddings may then be stored in vector database 112. At the same time as the video data is being indexed, the video data is also being stored to video data 114. In some embodiments, the streaming video data is stored directly into video data 114 which may include a local or remote data store. The video data 114 may be stored for a set amount of time before being overwritten by new video surveillance data. In some embodiments, each frame may be associated with a video identifier 206. The video identifier may be a time stamp or other arbitrary identifier value that uniquely identifies the corresponding video frame. These video identifiers may be synchronized with the vector database, such that the video index embeddings and the video data share the same video identifiers.

In some embodiments, the video data may be processed by alarm system 208. As discussed further below, alarm system 208 can provide real-time monitoring of the video data based on alarm definitions. In some embodiments, the alarm system can generate its own embedding for the incoming video data or can obtain the embeddings as they are generated by the video indexing model. The alarm system 208 can then compare the embeddings to a set of alarm embeddings. Each alarm embedding may be a text embedding associated with an alarm condition. If the embedding similarity value (e.g., L2, cosine similarity, or other similarity metric) computed between at least one frame embedding and at least one alarm embedding is greater than an alarm threshold, then the alarm system can generate an alert to one to more designated persons.

Figure 3:
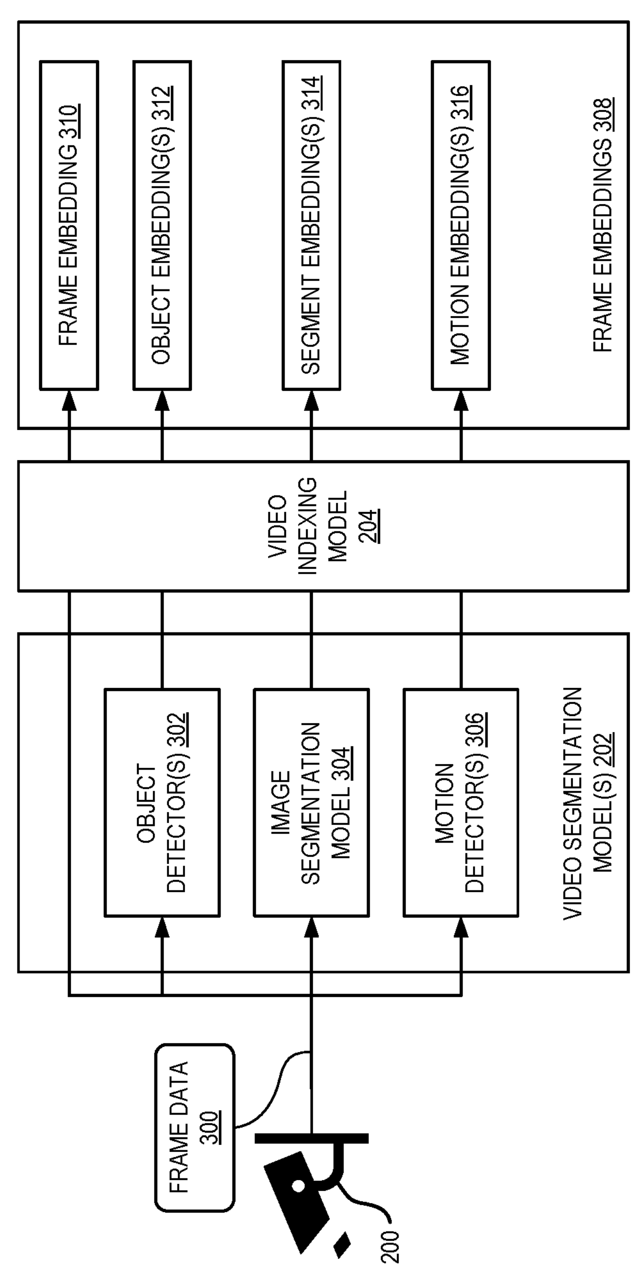
FIG. 3 illustrates a diagram of a process of indexing security video data for NLP search with multiple embeddings per frame in accordance with one or more embodiments.

FIG. 3 illustrates a diagram of a process of indexing security video data for NLP search with multiple embeddings per frame in accordance with one or more embodiments. As discussed above, in some embodiments, an incoming frame of surveillance video data is processed by one or more video segmentation models 202. The video segmentation models 202 may process each frame to identify a region of interest, if any, in the frames. For example, as shown in FIG. 3, a surveillance camera 200 streams video data to video segmentation models 202.

In general, models such as CLIP are trained on vast quantities of annotated internet data and can encode the general content of the images. As discussed, the training datasets do not typically use security footage or other similar surveillance video data. As a result, when a pre-trained CLIP model is applied to video-security footage, it will often largely fail to capture content about actors in the scene, such as people or cars. This is because these objects occupy only a small fraction of the overall image.

Accordingly, a frame embedding for an entire frame of video security footage may not provide much useful information. However, if the frame data is first augmented, then objects/regions of interest may be more readily identified. For example, as shown in FIG. 3, various image segmentation models may be used to augment the frame data with bounding boxes of candidate objects in the frame. The candidate objects may include running person/vehicle detector, pre-segmenting the image into objects (e.g., using methods, such as SAM), detecting areas of motion, etc. The video indexing model (e.g., CLIP, or similar model) may then be run individually on each of these identified objects or regions. This results in multiple embeddings per frame, each corresponding with an object/region of interest.

The streamed video data includes a plurality of frames (e.g., frame data 300). Each frame's data is processed in parallel by different video segmentation models. For example, object detector(s) 302 generates bounding boxes around objects identified by the model. The bounding boxes generated by the object detector can be used to extract the object from the frame, or mask everything but the object in the frame. This may then be processed by the video indexing model 204 to generate object embeddings. Similarly, the image segmentation model may generate bounding boxes corresponding to various portions of the scene. These bounding boxes may also be processed by the video indexing model to generate segment embeddings. Likewise, the motion detector 306 may generate bounding boxes corresponding to perceived movement in/across the frame data. When these portions of the frame data are processed by the video indexing model, they generate motion embeddings.

As shown in FIG. 3, the frame embedding 310 generated for the entire frame, and the object embedding 312, segment embedding 314, and motion embedding 316 may collectively be referred to as frame embeddings 308 and all may correspond to the same frame of video. This allows for more fine-grained searches to be accurately processed.

In some embodiments, new objects may be encountered by the natural language video monitoring system which have not previously been identified. In such instances, when a new object is detected, its corresponding embedding is generated as described above. The vector database 112 may be searched for similar embeddings. If not enough objects with an embedding similarity smaller than a threshold value exist, then an anomaly detection is triggered. This may prompt a user or other entity to label or otherwise identify the new object. Once labeled, the anomaly is cleared and any follow-up detections of the same or similar object will not trigger an anomaly.

Figure 4:
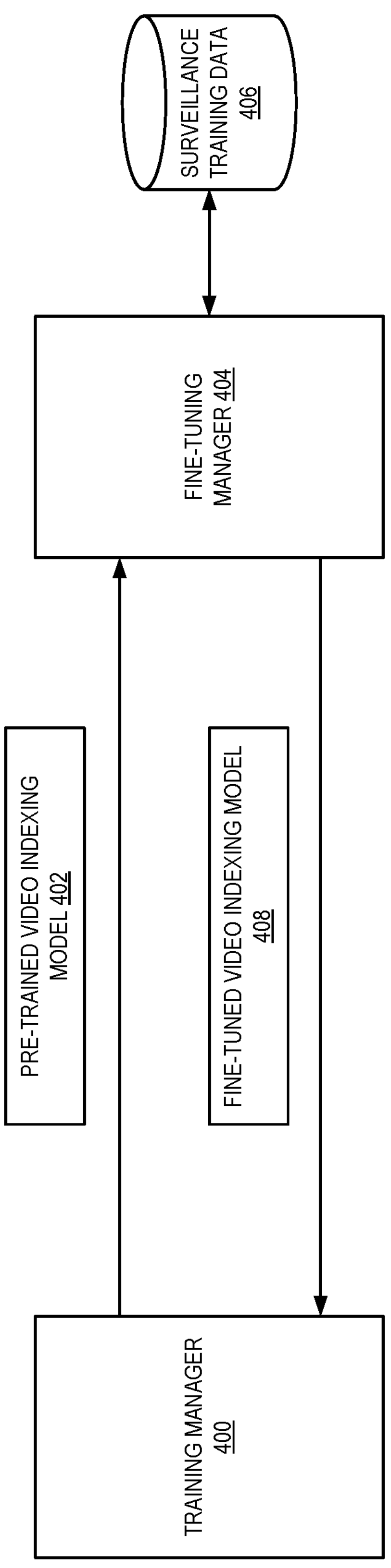
FIG. 4 illustrates a diagram of a process of fine-tuning a video indexing model in accordance with one or more embodiments.

FIG. 4 illustrates a diagram of a process of fine-tuning a video indexing model in accordance with one or more embodiments. As shown in FIG. 4, a training manager 400 is responsible for training models prior to deployment. Training may include tuning, teaching, etc. a neural network to perform a specific task using training data. The training manager will evaluate the performance of a model during training (e.g., using a loss function) and adjust the model accordingly (e.g., backpropagating gradients, adjusting rewards, etc.). Once the model is performing at an adequate level (e.g., after a number of training epochs), the training is complete, and the model is ready to be deployed.

As shown in FIG. 4, in some embodiments, an off the shelf model may come pretrained, such as pretrained video indexing model 402. In such instances, the model may still be fine-tuned for a specific task. For example, as noted above, the data used to train the pre-trained model, such as, CLIP, is likely to be different to the video security footage in terms of viewpoint variation and also distribution and nuance of recorded objects, that the model is likely to encounter once deployed. Due to this training vs. testing domain mismatch, the models can underperform in video security applications.

Fine-tuning manager 404 is responsible for fine-tuning the pre-trained model using surveillance training data 406. The fine-tuning training may include unsupervised pre-training where the model is trained using a self-supervised objective (such as DINO) on video footage data using a method. This results in adaptation of the network to objects present in the video security footage. Alternatively, the fine-tuning may include supervised ranking fine-tuning. In such instances, after the model is deployed, every time when a user searches for particular video content using text description and then clicks on one of the videos this creates a positive supervised training association between the text and the video while all other videos form a negative supervised association. Such data points are then added to the surveillance training dataset 406 as positive/negative retrieval examples leading to better association of text with searched video security videos.

Once fine-tuning is complete, the fine-tuned video indexing model 408 can be returned to the training manager 400 for further testing. For example, a portion of the surveillance training data 406 may be reserved to be used to verify the performance of the fine-tuned video indexing model. Once the model is determined to perform to desired standards, the model is deployed to the NVR edge device for use in indexing surveillance video at a customer site.

Figure 5:
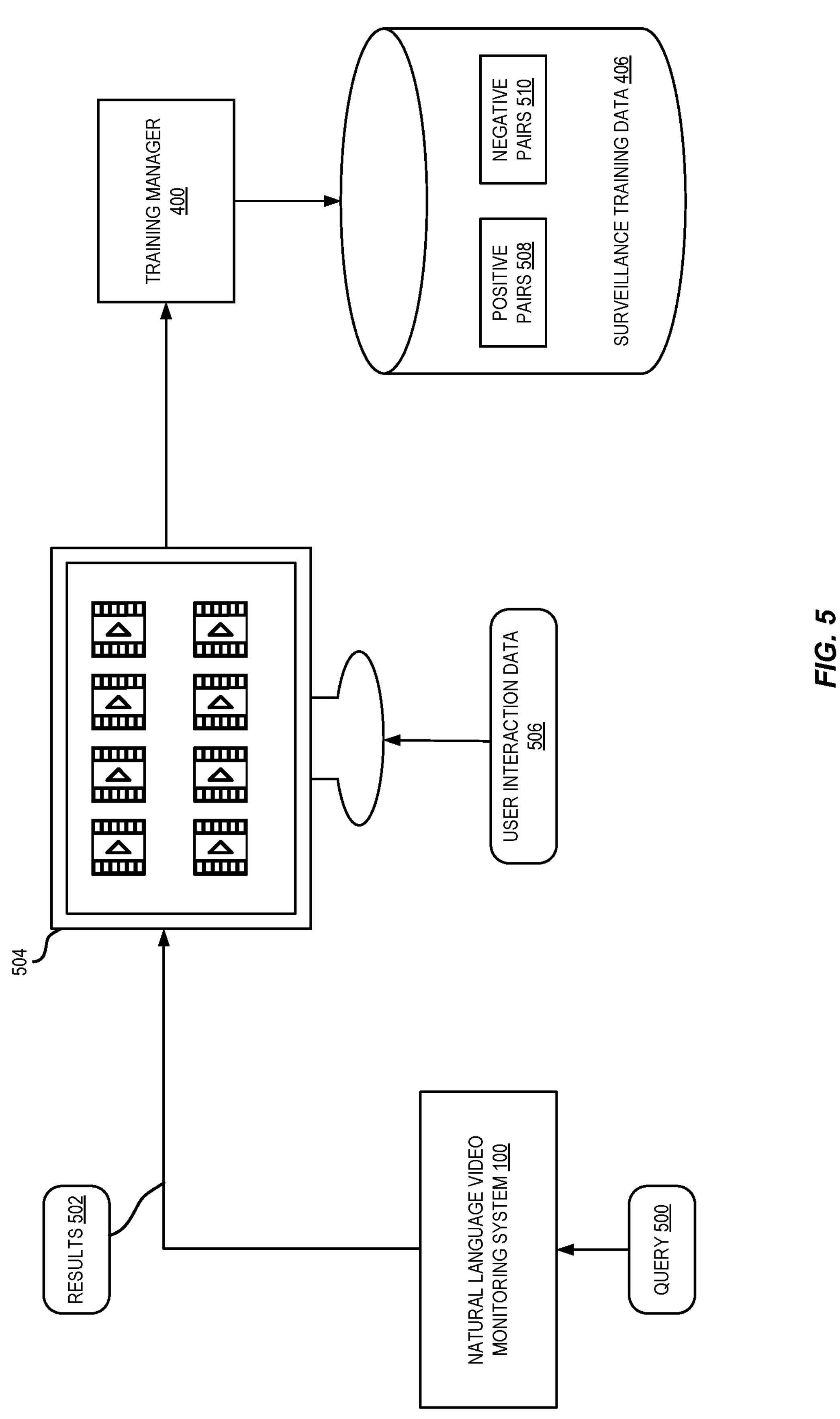
FIG. 5 illustrates a diagram of a process of generating training data in accordance with one or more embodiments.

FIG. 5 illustrates a diagram of a process of generating training data in accordance with one or more embodiments. As discussed, the surveillance training data 406 may be generated based on real-world user interaction data. For example, a user may provide a query 500 to natural language video monitoring system 100. The natural language video monitoring system 100 may then process the query as discussed above, generating query results 502. As discussed, the query results may be a ranked list of video clips from a single NVR or aggregated from across multiple NVRs at one or more customer sites. The results may be ranked based on the similarity of their corresponding embeddings to the query embedding generated for the query 500.

As shown in FIG. 5, the ranked results may be returned to the user via a presentation device 504. For example, a user interface may be presented in which the user can browse, play, and ultimately choose one or more videos that they believe match the query. This is captured as user interaction data 506. When a user selects a particular video from the ranked list, the query and the selected video are classified as a positive training pair 508 by training manager 400. The non-selected videos are classified as negative training pairs 510. Once a sufficient amount of surveillance training data 406 has been collected, then the surveillance training data may be used to fine-tune the model, as discussed above.

Figure 6:
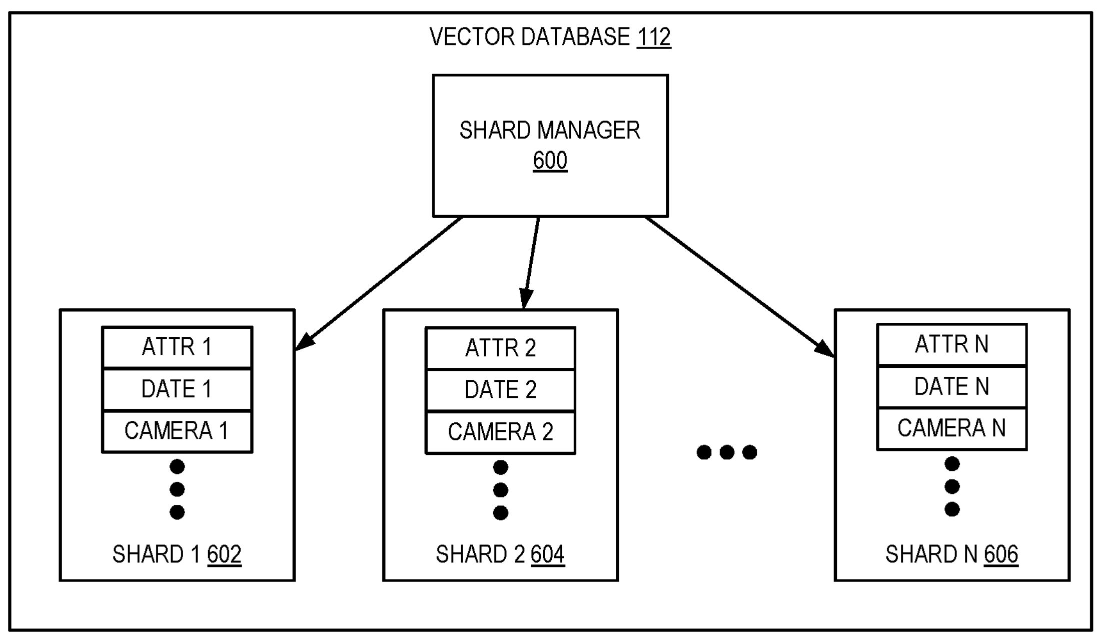
FIG. 6 illustrates a diagram of a sharded database of security video data in accordance with one or more embodiments.

FIG. 6 illustrates a diagram of a sharded database of security video data in accordance with one or more embodiments. As discussed, a vector database stores the video embeddings generated for the surveillance data, as described above. In some embodiments, the vector database 112 can use a highly-performant similarity search supported by index databases trained on captured sample video security data (i.e., FAISS).

In some embodiments, memory-mapped storage may be used which allows fast offloading and reloading of relevant indexes to and from the working memory to the hard drive. Additionally, the vector database supports parallelized search which enables searching multiple indexes at the same time. Performing a hybrid search across both embedding similarity and multiple embedding attributes (e.g., metadata) is then achieved by querying only relevant indexes and posts, performing a similarity search, and filtering results to satisfy all additional constraints.

Additionally, as shown in FIG. 6, the vector database may also be sharded based on metadata associated with the embeddings, such as date, time, camera ID, etc. This sharding allows for only the relevant subset of the database to be searched. Sharding may include dividing the index of the vector database 112 and/or the underlying data stored in the database into multiple portions (e.g., "shards"). As shown in FIG. 6, a shard manager 600 can manage data requests and route them to the appropriate shard 602-606. In some embodiments, attribute data may determine which shard is associated with particular data. For example, camera 1 data is associated with shard 1 602, while camera 2 data is associated with shard 2 604. When a query is received, the shard manager 600 can determine the shard or shards associated with the query and limit the query processing to those shards, saving resources and reducing query time.

Figure 7:
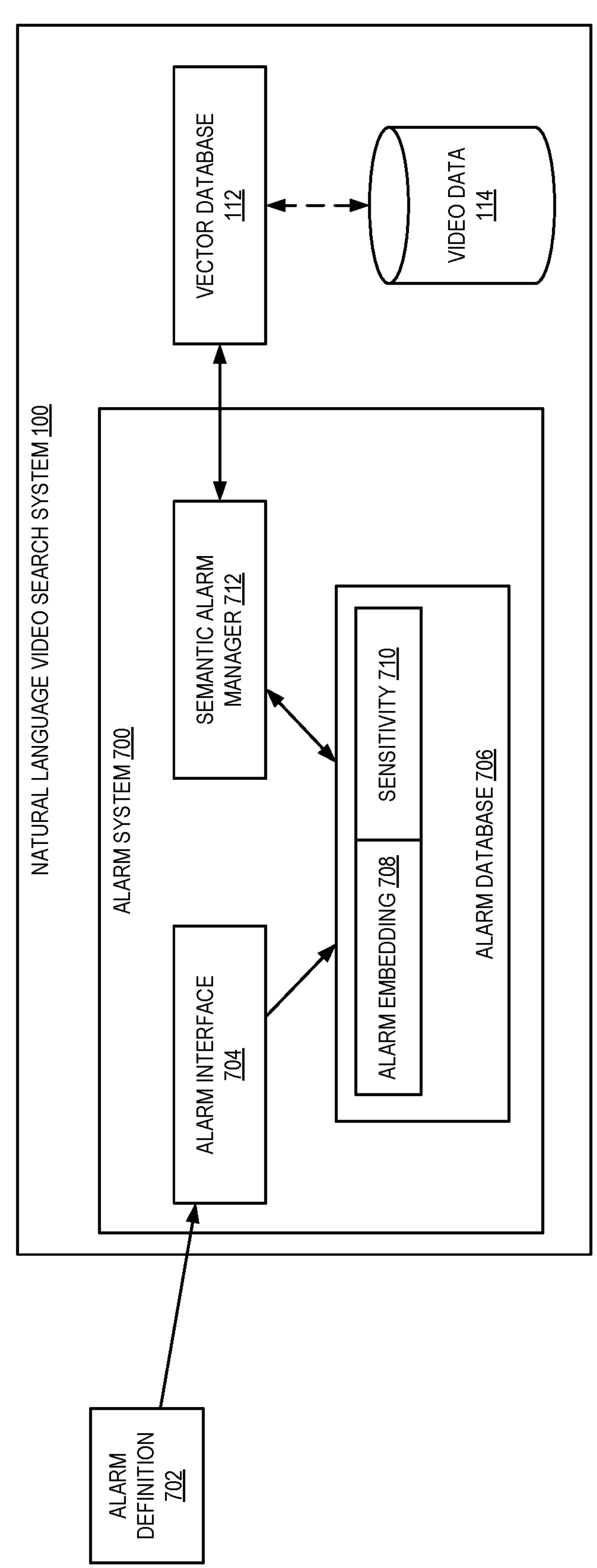
FIG. 7 illustrates a diagram of an alarm system in accordance with one or more embodiments.

FIG. 7 illustrates a diagram of an alarm system in accordance with one or more embodiments. As shown in FIG. 7, the natural language video monitoring system 100 can also include alarm system 700. As discussed above, alarm system 700 can provide real-time monitoring of the video data based on alarm definitions. Models, such as CLIP can compute ranking of videos based on the similarity between [0,1] to a user text query (0—most similar, 1—least similar). However, semantic alarms are binary events, either an alarm condition is present, or it is not. This presents challenges when attempting to determine whether a video actually shows an alarm condition. This can result in false positives and false negatives.

In some embodiments, an alarm definition 702 is received from a user or other entity. The alarm definition may be received via an alarm interface 704. For example, the alarm interface 704 may be a graphical user interface that walks the user through defining an alarm, the steps to be taken in response to the alarm, etc. The alarm interface can use the text query model, or similar model, to generate an alarm embedding 708 corresponding to the alarm definition. The alarm embedding 708 and a corresponding sensitivity 710 can be stored in alarm database 706.

Accordingly, when setting a semantic alarm, the user needs to provide an additional argument-sensitivity 710. Videos with a similarity value between the alarm embedding and the video embedding that is less than the threshold are then treated as positives and videos with similarity greater than threshold are treated as negatives.

To determine this threshold one of two techniques can be used. For arbitrary alarms that the user defines, a trial-and-error approach may be used. This enables the user to dial in the right sensitivity value such that precision and recall is acceptable and then optionally adjusting this sensitivity. For known alarms, e.g., "smoke detection", the sensitivity parameter can be pre-computed.

Additionally, in some embodiments, the alarm system 700 can monitor video data in real-time and/or can review recorded video data to identify past alarm conditions. For example, as new video data is recorded and added to the vector database 112 and video data 114, the semantic alarm manager 712 can actively compare the alarm embeddings to the vector database 112. If a matching embedding is identified, based on the sensitivity value 710, then the alarm is triggered. In some embodiments, each alarm is associated with one or more actions to be performed. For example, notifications may be sent to specific employees, mitigation systems (e.g., sprinklers, etc.) may be activated at the customer site, emergency services may automatically be contacted, etc.

Figure 8:
FIG. 8 illustrates a flowchart of a series of acts in a method of searching security video data in accordance with one or more embodiments.
Figure 8:
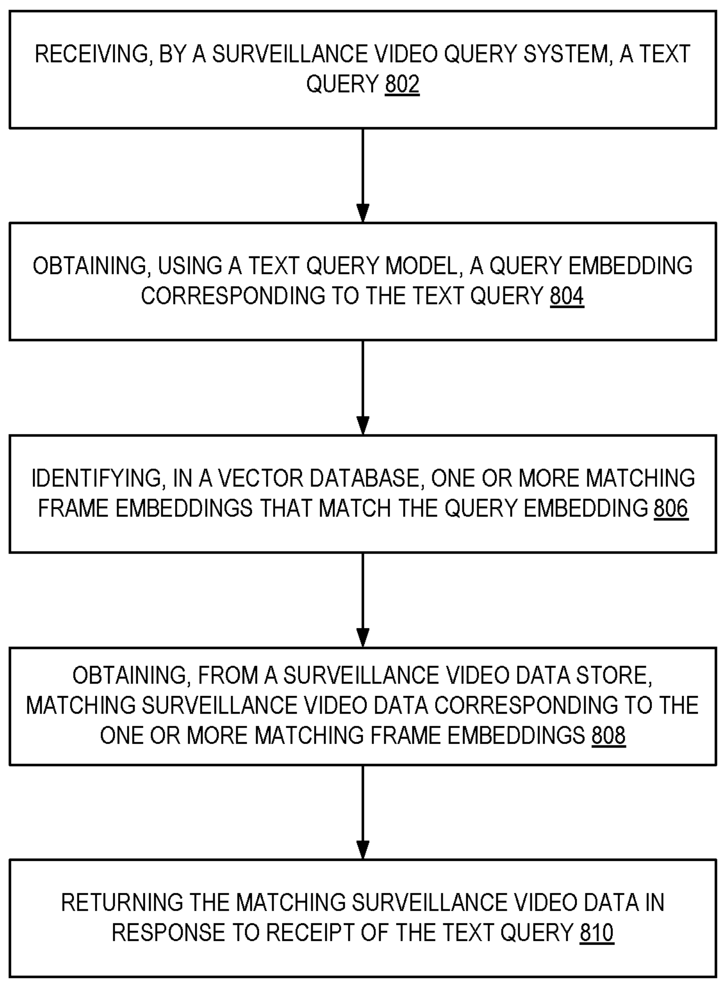

FIG. 8 illustrates a flowchart of a series of acts in a method of searching security video data in accordance with one or more embodiments. In one or more embodiments, the method 800 is performed by or using the natural language video search system 100 (e.g., in a digital environment). The method 800 is intended to be illustrative of one or more methods in accordance with the present disclosure and is not intended to limit potential embodiments. Alternative embodiments can include additional, fewer, or different steps than those articulated in FIG. 8.

As illustrated in FIG. 8, the method 800 includes an act 802 of receiving, by a surveillance video query system, a text query. As discussed, the text query may be any natural language query and may be received via a user input device (e.g., mouse, keyboard, speech to text, etc.). In some embodiments, the text query may be chosen from a list of available text queries. Alternatively, the text query may include any arbitrary query provided by the user.

As illustrated in FIG. 8, the method 800 includes an act 804 obtaining, using a text query model, a query embedding corresponding to the text query. The text query model may include a neural network, or other machine learning model, trained to generate a query embedding from a text input. In some embodiments, the text query model is a Contrastive Language-Image Pre-Training (CLIP) model.

As illustrated in FIG. 8, the method 800 includes an act 806 identifying, in a vector database, one or more matching frame embeddings that match the query embedding. In some embodiments, the vector database includes a plurality of frame embeddings corresponding to frames of surveillance video data captured by one or more video capture devices located at a user site, wherein the frames of the surveillance video data are each processed by one or more video segmentation models and a video indexing model to generate one or more frame embeddings per frame. In some embodiments, identifying, in a vector database, one or more matching frame embeddings that match the query embedding further comprises determining at least one of a video capture device identifier, date, or attribute based on the text query, determining a shard of the vector database corresponding to the video capture device identifier, date, or attribute based on the text query, and searching the shard for the one or more matching frame embeddings.

In some embodiments, identifying, in a vector database, one or more matching frame embeddings that match the query embedding, further comprises identifying a first one or more matching frame embeddings from a first vector database associated with a first video capture device, identifying a second one or more matching frame embeddings from a second vector database associated with a second video capture device, and aggregating the first one or more matching frame embeddings and the second one or more matching frame embeddings based on a relevance score to form the one or more matching frame embeddings that match the query embedding.

In some embodiments, the method further comprises identifying a relevant portion of at least one frame of the surveillance video data, and processing at least the relevant portion of the at least one frame of the surveillance video data using the video indexing model to generate at least one frame embedding for the at least one frame.

In some embodiments, identifying a relevant portion of at least one frame of the surveillance video data, further comprises processing the at least one frame of the surveillance video data using the one or more video segmentation models, the one or more video segmentation models including at least one of an object detector, an image segmentation model, and a motion detector, and identifying the relevant portion based on outputs of the one or more video segmentation models.

As illustrated in FIG. 8, the method 800 includes an act 808 obtaining, from a surveillance video data store, matching surveillance video data corresponding to the one or more matching frame embeddings. In some embodiments, obtaining, from a surveillance video data store, matching surveillance video data corresponding to the one or more matching frame embeddings, further comprises identifying the matching surveillance video data using a video identifier associated with the one or more matching frame embeddings, wherein surveillance videos stored in the surveillance video data store are linked to frame embeddings in the vector database using video identifiers.

As illustrated in FIG. 8, the method 800 includes an act 810 returning the matching surveillance video data in response to receipt of the text query.

In some embodiments, the method further comprises receiving a selection of a video from the matching surveillance video data, wherein the matching surveillance video data includes a plurality of matching videos, labeling the selected video and the text query as a positive pair and any non-selected videos and the text query as negative pairs, and updating a training dataset using the positive and negative pairs. In some embodiments, the training dataset is used to fine tune the text query model at training time.

In some embodiments, a system for indexing video data at the edge, comprises one or more video capture devices positioned at a user location and a natural language video monitoring device coupled to the one or more video capture devices at the user location. The natural language video monitoring device includes at least one processor which performs operations comprising receiving surveillance video data from the one or more video capture devices, processing each frame of the surveillance video data using a video segmentation model and a video indexing model to generate a plurality of frame embeddings per frame, wherein the video segmentation model and the video indexing model execute on the natural language video monitoring device, and storing the plurality of frame embeddings per frame in a vector database.

In some embodiments, the operation of processing each frame of the surveillance video data using a video segmentation model and a video indexing model to generate a plurality of frame embeddings per frame, wherein the video segmentation model and the video indexing model execute on the natural language video monitoring device, further comprise identifying a plurality of bounding boxes using the video segmentation model, wherein the video segmentation model includes one or more of an object detector, an image segmentation model, and a motion detector, and generating, using the video indexing model, a frame embedding for each bounding box, wherein the bounding boxes generated by the object detector are processed by the video indexing model to generate object embeddings, the bounding boxes generated by the image segmentation model are processed by the video indexing model to generate segment embeddings, and the bounding boxes generated by the motion detector are processed by the video indexing model to generate motion embeddings.

In some embodiments, the operation of processing each frame of the surveillance video data using a video segmentation model and a video indexing model to generate a plurality of frame embeddings per frame, wherein the video segmentation model and the video indexing model execute on the natural language video monitoring device, further comprises determining a plurality of embedding similarity values by comparing the plurality of frame embeddings to a set of alarm embeddings, wherein each alarm embedding is a text embedding associated with an alarm condition, determining an embedding similarity value computed between at least one frame embedding and at least one alarm embedding is greater than an alarm threshold, and causing an alert associated with the alarm condition corresponding to the at least one alarm embedding to be sent.

Figure 9:
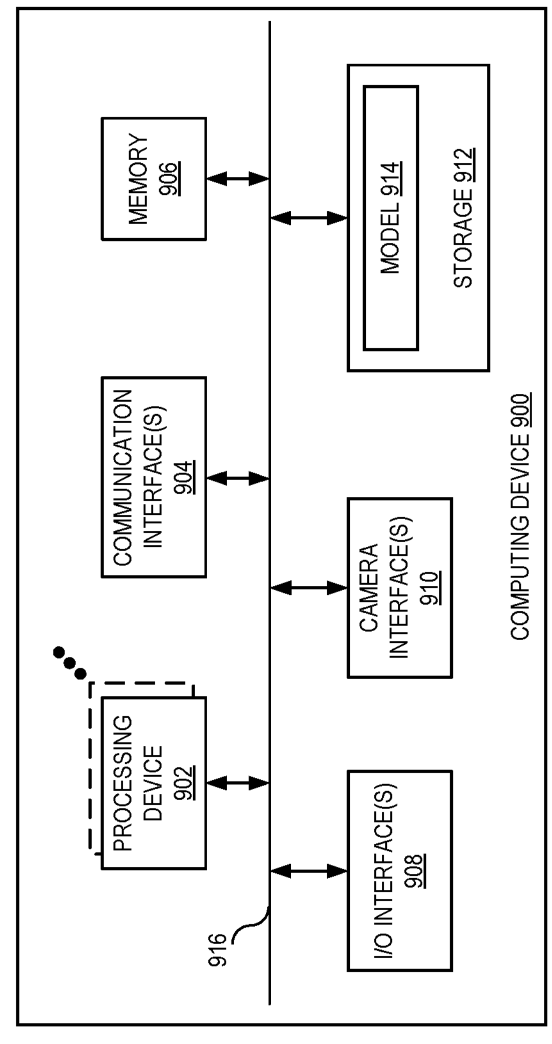
FIG. 9 illustrates a block diagram of an exemplary computing device in accordance with one or more embodiments.

FIG. 9 illustrates a block diagram of an exemplary computing device 900 in accordance with one or more embodiments. The computing device 900 may represent an NVR implementing the natural language video monitoring system 100 which is configured to perform one or more of the processes described above. As shown in FIG. 9, the computing device can comprise a processing device 902, communication interface(s) 904, memory 906, I/O interface(s) 908, video capture device (e.g., camera) interface(s) 910, and a storage device 912 including at least one model 914. In various embodiments, the computing device 900 can include more or fewer components than those shown in FIG. 9. The components of computing device 900 are coupled via a bus 916. The bus 916 may be a hardware bus, software bus, or combination thereof.

Processing device 902 includes hardware for executing instructions. The processing device 902 is configured to fetch, decode, and execute instructions. The processing device 902 may include one or more central processing units (CPUs), graphics processing units (GPUs), accelerators, field programmable gate arrays (FPGAs), systems on chip (SoC), or other processor(s) or combinations of processors.

A communication interface(s) 904 can include hardware and/or software communication interfaces that enable communication between computing device 900 and other computing devices or networks. Examples of communication interface(s) 904 include a network interface controller (NIC) or network adapter for communicating with an Ethernet or other wire-based network or a wireless NIC (WNIC) or wireless adapter for communicating with a wireless network, such as a WI-FI, etc.

Memory 906 stores data, metadata, programs, etc. for execution by the processing device. Memory 906 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 906 may be internal or distributed memory.

In some embodiments, the computing device 900 includes input or output ("I/O") interfaces 908. The I/O interface(s) enable a user to interact with (e.g., provide information to and/or receive information from) the computing device 900. Examples of devices which may communicate via the I/O interfaces 908 include a mouse, keypad or a keyboard, a touch screen, camera, optical scanner, network interface, modem, or other I/O devices. The I/O interfaces 908 may also facilitate communication with devices for presenting output to a user. This may include a graphics engine, a display (e.g., a display screen), one or more output drivers (e.g., display drivers), one or more audio speakers, and one or more audio drivers. In some embodiments, graphical data corresponding to a graphical user interface is provided to a display for presentation to a user using the I/O interfaces.

In some embodiments, computing device 900 may include camera interfaces 910. Camera interfaces 910 may include high speed, high bandwidth, or otherwise specialized or dedicated interfaces to facilitate the transfer of large quantities of video data for processing by the computing device 900 in real time.

The computing device 900 also includes a storage device 912 for storing data or instructions, and one or more machine learning models 914, as described herein. As an example, and not by way of limitation, storage device 912 can comprise a non-transitory computer readable storage medium. The storage device 912 may include a hard disk drive (HDD), flash memory, a Universal Serial Bus (USB) drive or a combination of these or other storage devices.

Figure 10:
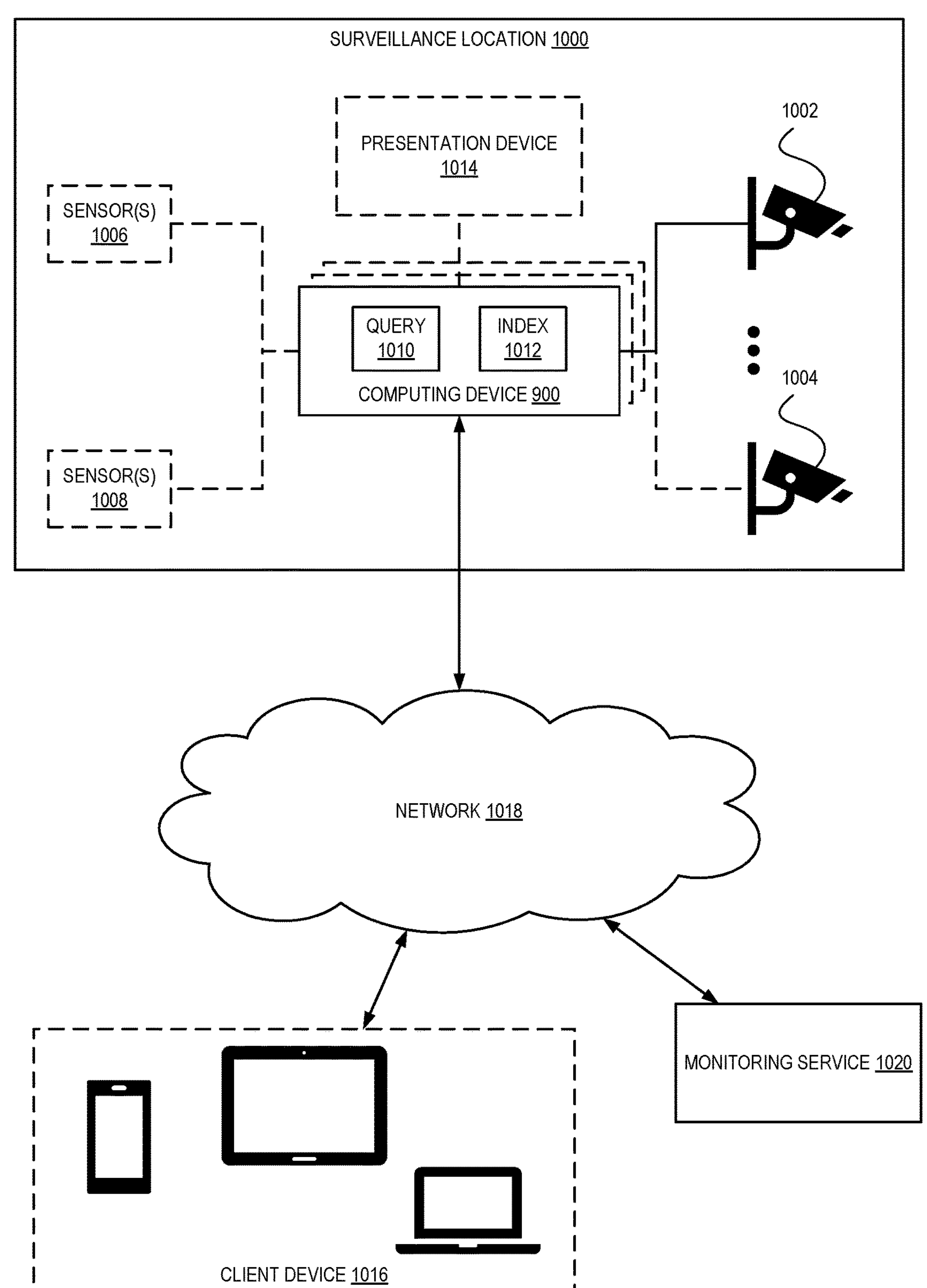
FIG. 10 illustrates a block diagram of an exemplary system in accordance with one or more embodiments.

FIG. 10 illustrates a block diagram of an exemplary system in accordance with one or more embodiments. In the example of FIG. 10 a surveillance location 1000 includes a computing device 900 on which the natural language video monitoring system 100 can operate in accordance with one or more embodiments. The surveillance location 1000 includes one or more video capture devices 1002-1004 in communication with the computing device 900 (e.g., via local wired or wireless networks). In some embodiments, the surveillance location may also include one or more sensors 1006-1008. These may include other devices which capture information about the surveillance location, such as audio sensors, LiDAR sensors, rangefinders, monocular cameras, non-visible spectra cameras, etc.

As discussed, the natural language video monitoring system 100 executing on computing device 900 may include a query system 1010 and a video indexing system 1012. The query system 1010 enables users to search live or stored video using natural language search techniques. The video indexing system 1012 automatically generates embeddings for incoming video data and stores both the embedding data and video data for later search. A user may access the computing device 900 via a local presentation device 1014 (e.g., monitor) and user input devices, or remotely via one or more client devices 1016. When accessed remotely, the computing device 900 is accessed over one or more networks 1018, such as the Internet. In some embodiments, a monitoring service 1020 may be provided by a service provider or other entity to facilitate communication over the Internet between the client device 1016 and the computing device 900. In various embodiments, the components shown in FIG. 10 may communicate using any communication platforms and technologies suitable for transporting data and/or communication signals, including any known communication technologies, devices, media, and protocols supportive of remote data communications.

As illustrated in FIG. 10, the environment may include client devices 1016. The client devices 1016 may comprise any computing device. For example, client devices 1016 may comprise one or more personal computers, laptop computers, mobile devices, mobile phones, tablets, special purpose computers, TVs, or other computing devices. Although three client devices are shown in FIG. 10, it will be appreciated that client devices 1016 may comprise any number of client devices (greater or smaller than shown).

The one or more networks 1018 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 1018 may be any suitable network over which the client devices 1016 may access computing device 900, monitoring service 1020, or vice versa.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method, comprising:

obtaining surveillance video data using one or more image capture devices located at a user location;

generating frame embeddings for each frame of the surveillance video data as it is received, wherein each frame embedding is a vector representing a corresponding frame of the surveillance video data;

identifying an alarm condition based on the frame embeddings and one or more alarm embeddings, wherein the one or more alarm embeddings are text embeddings; and generating an alert based on the alarm condition.

2. The method of claim 1, wherein the alarm condition is a user-defined alarm condition.

3. The method of claim 2, further comprising:

receiving a text description of the user-defined alarm condition; and generating, using a machine learning model, a custom alarm embedding based on the text description, wherein the one or more alarm embeddings include the custom alarm embedding.

4. The method of claim 3, wherein identifying an alarm condition based on the frame embeddings and one or more alarm embeddings further comprises:

determining a similarity value between the custom alarm embedding and the frame embeddings; and identifying the alarm condition based on the similarity value and a sensitivity value associated with the user-defined alarm condition.

5. The method of claim 4, wherein the sensitivity value is received with the text description of the user-defined alarm condition.

6. The method of claim 4, wherein the sensitivity value is predefined based on the text description of the user-defined alarm condition.

7. The method of claim 1, wherein generating an alert based on the alarm condition, further comprises:

activating one or more mitigation systems at the user location based on the alarm condition.

8. The method of claim 1, wherein identifying an alarm condition based on the frame embeddings and one or more alarm embeddings, further comprises:

identifying a new object in the surveillance video data;

generating an anomaly embedding for the new object;

identifying similar embeddings to the anomaly embedding are present in a vector database; and triggering an anomaly detection.

9. The method of claim 8, wherein generating an alert based on the alarm condition, further comprises:

causing a user interface element to be displayed on a user interface, the user interface element prompting a user to label the anomaly; and clearing the anomaly detection.

10. A system, comprising:

a processor; and a computer readable storage medium including instructions stored thereon which, when executed by the processor, cause the system to perform operations comprising:

obtaining surveillance video data using one or more image capture devices located at a user location;

generating frame embeddings for each frame of the surveillance video data as it is received, wherein each frame embedding is a vector representing a corresponding frame of the surveillance video data;

identifying an alarm condition based on the frame embeddings and one or more alarm embeddings, wherein the one or more alarm embeddings are text embeddings; and generating an alert based on the alarm condition.

11. The system of claim 10, wherein the alarm condition is a user-defined alarm condition.

12. The system of claim 11, wherein the operations further comprise:

receiving a text description of the user-defined alarm condition; and generating, using a machine learning model, a custom alarm embedding based on the text description, wherein the one or more alarm embeddings include the custom alarm embedding.

13. The system of claim 12, wherein the operation of identifying an alarm condition based on the frame embeddings and one or more alarm embeddings further comprises:

determining a similarity value between the custom alarm embedding and the frame embeddings; and identifying the alarm condition based on the similarity value and a sensitivity value associated with the user-defined alarm condition.

14. The system of claim 13, wherein the sensitivity value is received with the text description of the user-defined alarm condition or is predefined based on the text description of the user-defined alarm condition.

15. The system of claim 10, wherein the operation of identifying an alarm condition based on the frame embeddings and one or more alarm embeddings, further comprises:

identifying a new object in the surveillance video data;

generating an anomaly embedding for the new object;

identifying similar embeddings to the anomaly embedding are present in a vector database; and triggering an anomaly detection.

16. The system of claim 15, wherein the operation of generating an alert based on the alarm condition, further comprises:

causing a user interface element to be displayed on a user interface, the user interface element prompting a user to label the anomaly embedding; and clearing the anomaly detection.

17. A method, comprising:

receiving a request to search surveillance video data, the request including a text query;

obtaining a query embedding corresponding to the text query, wherein the query embedding is a vector representation of descriptors in the text query;

matching one or more frame embeddings corresponding to frames of the surveillance video data to the query embedding, wherein each of the one or more frame embeddings is a vector representing a corresponding frame of the surveillance video data; and identifying at least one surveillance video corresponding to the one or more frame embeddings.

18. The method of claim 17, further comprising:

receiving the surveillance video data live from one or more image capture devices at a user location.

19. The method of claim 17, further comprising:

obtaining the surveillance video data from a surveillance video data archive.

20. The method of claim 17, wherein matching one or more frame embeddings corresponding to frames of the surveillance video data to the query embedding, further comprises:

determining a similarity value for the query embedding and each of the one or more frame embeddings, wherein a frame embedding includes one or more of an object embedding, a segment embedding, or a motion embedding, and wherein the similarity value is determined for each object embedding, segment embedding, and motion embedding; and identifying the one or more matching frame embeddings based on the similarity values.

* * * * *